US012653177B2

(12) United States Patent

Coutinho Filho

(10) Patent No.: US 12,653,177 B2
(45) Date of Patent: Jun. 16, 2026

(54) ELECTRICAL WEEDING DEVICE

(71) Applicants:Zasso Group AG, Zug (CH); Zasso Brasil Indústria e Comércio de Máquinas Ltda., Indaiatuba (BR)

(72) Inventor: Sergio de Andrade Coutinho Filho, Indaiatuba (BR)

(73) Assignees: Zasse Group AG, Cham (CH); Zasso Brasil Indústria e Comércio de Máquinas Ltda., Indaiatuba (BR)

( * ) Notice: Subject to any disclaimer, the term of this patent is extended or adjusted under 35 U.S.C. 154(b) by 66 days.

(21) Appl. No.: 18/833,415

(22) PCT Filed: Sep. 5, 2022

(86) PCT No.: PCT/BR2022/050354

§ 371 (c)(1),
(2) Date: Jul. 26, 2024

(87) PCT Pub. No.: WO2023/178398

PCT Pub. Date: Sep. 28, 2023

(65) Prior Publication Data

US 2025/0098661 A1     Mar. 27, 2025

(51) Int. Cl.
*A01M 21/04* (2006.01)
*H02M 3/335* (2006.01)

(52) U.S. Cl.
CPC ...... *A01M 21/046* (2013.01); *H02M 3/33571* (2021.05)

(58) Field of Classification Search
CPC .... H02M 3/285; H02M 1/007; H02M 3/1584; H02M 3/1586; H02M 1/0009;
(Continued)

(56) References Cited

U.S. PATENT DOCUMENTS

| | | | |
|---|---|---|---|
| 4,428,150 A | 1/1984 | Geiersbach et al. | |
| 2014/0276754 A1* | 9/2014 | Gilbert ............... | A61B 18/1206 606/33 |

(Continued)

FOREIGN PATENT DOCUMENTS

| | | |
|---|---|---|
| EP | 19152341 | 4/2008 |
| EP | 3415004 | 12/2018 |

(Continued)

OTHER PUBLICATIONS

International Search Report and the Written Opinion Dated Nov. 21, 2022 From the International Searching Authority Re. Application No. PCT/BR2022/050354. (9 Pages).
Examination Report Dated Mar. 4, 2025 From the Australian Government, IP Australia Re. Application No. 2022449072. (2 Pages).
(Continued)

*Primary Examiner* — Wei (Victor) Y Chan

(57) ABSTRACT

The invention relates to an electrical weeding device, comprising at least two electrodes, whereby the at least one electrode is directed to the weed. The weed activation device is used as a physical herbicide apparatus. The invention relates to a weed inactivation device, comprising at least two electrodes, whereby the at least one electrode is directed to the weed.

Object of the current invention is to provide for a use of small, cheap, high-power factor efficient and effective electronic converter to control for constant power output with minimal voltage parasitic fluctuations. In order to achieve this objective, the present invention proposes a weed inactivation device comprising an electrical power source, at least one electronic converter, which comprises a power inverter, a transformer coupled to the inverter and a voltage multiplier coupled to the transformer. The device further comprises a plurality of electrodes coupled to the at least one electronic converter, wherein at least one electrode is pointed at one or more loads (or weed system), and a control unit. The control unit comprising a PWM module and at (Continued)

least one sensor, wherein the PWM module is coupled to the at least one electronic converter and the at least one sensor is coupled to the plurality of electrodes. The control unit controls the power output of the at least one electronic converter to supply, within a determined load range, substantially constant power to the plurality of electrodes by adjusting the duty cycle of the PWM module according to the load and limiting parasitic voltage peaks to 1 kV.

12 Claims, 8 Drawing Sheets

(58) Field of Classification Search
CPC .. H02M 1/08; H02M 7/4833; H02M 7/53871; H02M 1/0043; H02M 3/33576
See application file for complete search history.

(56) References Cited

U.S. PATENT DOCUMENTS

| | | | |
|---|---|---|---|
| 2018/0325091 A1 | 11/2018 | Kroeger et al. | |
| 2019/0320641 A1* | 10/2019 | Rona ................. | H02M 3/33571 |
| 2020/0205395 A1* | 7/2020 | De Andrade Coutinho Filho ...... | H02H 7/10 |
| 2023/0369981 A1* | 11/2023 | Schmidt .............. | H02M 1/0009 |

FOREIGN PATENT DOCUMENTS

| | | |
|---|---|---|
| EP | 3744173 | 12/2020 |
| WO | WO 2013/051276 | 4/2013 |
| WO | WO 2015/119523 | 8/2015 |
| WO | WO 2016/016627 | 2/2016 |

OTHER PUBLICATIONS

Supplementary European Search Report and the European Search Opinion Dated Feb. 3, 2025 From the European Patent Office Re. Application No. 22932497.7. (4 Pages).

* cited by examiner

ELECTRICAL WEEDING DEVICE

RELATED APPLICATIONS

This application is a National Phase of PCT Patent Application No. PCT/BR2022/050354 having International filing date of Sep. 5, 2022, which is a Continuation (CON) of PCT Patent Application No. PCT/BR2022/050107 filed on Mar. 25, 2022. The contents of the above applications are all incorporated by reference as if fully set forth herein in their entirety.

TECHNICAL FIELD AND BACKGROUND OF THE INVENTION

The invention relates to the field of electrical weeding devices, comprising at least two electrodes, in which at least one electrode is directed to the weed. The weed inactivation device is used as a physical herbicide apparatus.

BACKGROUND

Efficacy on systemic plant control is direct consequence of killing the plant's root system, not the air system. A plant might recover if its air system is somewhat damaged, but it will certainly die if its root system becomes unable to send nutrients to the rest of the plant, that necessarily will perish from nutrient deficiency. Ideally, the efficacy of plant electrocution can be considered to be binary (plant is dead or not dead). The efficacy can be considered as the relation between the Fatal Energy Consumption needed at the individual plant's root and the volume of the root system.

Active power in a given electrical circuit may be simplified and given by:

$$P = V * I$$

where P is power, V is the voltage across the circuit and I is the current provided by the source. Additionally, Energy is Power consumed over a period of time, which may be given by:

$$E = P * t$$

where E is energy, P is power and t is a time interval. Therefore, given a certain voltage V and a certain time interval applying this voltage, a lower total resistance means more energy flows through the plant, and a higher total resistance means less energy flows through the plant. Total resistance or load or load resistance is a series of parallel plant resistances and soil resistances that exist between the electrodes that approximates the total impedance experienced by the electrodes of the equipment.

There may be a plurality of electrodes, a plurality of plants, the electrodes may all be directed to the plants, or to the plants and the soil, but at least one active electrode should always be directed to the targeted plants.

Considering that said system is always constrained by the maximum power output of a alternating current (AC) or direct current (DC) power source, the ideal system outputs constant power regardless of the total resistance the electrodes experience.

In order to maximize the effectiveness of the treatment, it is necessary to maximize energy consumed, and the energy consumed is the integral of the power curve in time, which is by itself dependent on the voltage, as shown above. Therefore, the ideal system would always provide DC with a voltage output that ensures constant power, given the ever-changing load of real field operation.

The DC voltage values should preferably be in the range of 1 kV-10 kV, which is the range necessary to ensure constant power delivery in the most common load range of a regular field operation. The peak DC voltage is defined as the maximum DC voltage. In particular cases, such as railway dead beds, highways and urban roads, these values can reach up to 15 kV, 20 kV, 30 kV or even 40 kV.

This means, ideally, that the processed electrical energy output should not be a waveform with repeating shapes, but a DC power source that is able to vary its voltage according to the load so as to ensure constant power delivery. Given the cycles of charge and discharge of the capacitors of the voltage multiplier, when the load is low, parasite voltage peaks may be seen, but should be kept as low as possible and always below 1 kV.

Parasitic peak voltages may arise as the charge of the capacitors decrease faster than the input from the secondary of the transformer can charge. This effect is especially high when either loads are too low or switching frequencies are too low. When loads are too low, the capacitors discharge too fast and when switching frequencies are too low, the PWM or similar controls cannot act fast enough to counter act the discharge. Typical switching frequencies are above 1 kHz and below 1 MHz.

The parasitic peak voltage is defined as the peak amplitude of the repeating units of the parasitic waveform which superimposes the variable DC voltage, and may take form as ripples, commonly found in rectifiers. Peak-to-peak voltage is greater than the peak voltage and typically twice that of a sinusoidal waveform. The parasitic waveform is the repeating unit defined as a unit that repeats with substantially the same form, e.g., it may comprise waveforms of substantial the same shape including when the amplitude and/or duty cycle or period is adjusted for control of the processed electrical energy. These definitions can be found in document "WO2016016627—APPARATUS AND METHOD FOR ELECTRICALLY KILLING PLANTS".

Weed pressure is a function of the density of weeds per area, organic mass per area and type of weeds. The weed pressure faced by the equipment can vary, changing with it the energy needed to ensure proper weed control. As the ideal equipment should be able to always output constant power to maximize the use of the power source constraints, in the case of any surplus energy, due to low weed pressure, it is more efficient to adjust power delivery by means of a sensor that measures weed pressure, or to just speed up the equipment, reducing the energy per area.

Traditional systems that have AC or greatly varying voltages with fixed waveforms with high voltage peaks, such as the ones exemplified in documents WO2013051276, WO2015119523, WO2016016627 and EP3744173 have a hugely varying power delivery through changing resistances that will be sub-optimal on its energy efficiency usage due to hugely varying energy consumption at the plant, leading to either uneven quality of application or will require a much larger power input capability with higher energy consumption to ensure enough energy is delivered when resistances are high because plants or plants-soil or plants-soil-plants resistive systems vary greatly in practical applications. Such behavior can be seen in FIG. 11. It is possible to even the average power delivered through continuity switches and controls such as PWM and PDM, as thought in EP3744173, but this accounts for average power, not continuous power delivery, which can only be achieved by a continuous DC that varies its voltage to account for dynamic resistance changes to ensure continuous power delivery, as the present invention proposes.

Document EP3744173 explains thoroughly the use of PWM and PDM to control for power in electrical weeding operations. It offers a constant voltage architecture as the output of a transformer, and the PWM and PDM controls work as a continuity switch that controls the power by controlling the continuity of the current. In other words, it is a constant AC voltage supply that is controlled by continuity to limit current, offering a constant power source. This is a sub-optimal solution considering the output is not constant DC that only varies with the dynamically changing loads to ensure constant power delivery.

Document EP19152341 describes a frequency converter, a transformer and a capacitive voltage multiplier composed of diodes and capacitors. To ensure semi-constant power, it uses the impedance matching implicit of the voltage multiplier, which happens in a self-adjustable way, without the necessity of a control strategy implementation. This happens to a certain degree because when the resistive load tends to a low value (short-circuit situation), the voltage multiplier presents a series impedance reflected to the primary that, associated with the external inductor of the filter, protects the transformer against high short-circuit currents. When the load tends to a high value (open circuit situation), all the capacitors of the voltage multiplier are charged, increasing the secondary voltage peak, but still limiting it to a maximum value equals the multiplier stage. In other words, when the load is higher than the load that delivers maximum power, the power diminishes because the converter cannot increase the voltage enough to ensure constant power, and when the load is lower than the load that deliver maximum power, the internal impedance reflected increases, lowering the power delivered. A typical power curve (y axis in watts—w) against the load (x axis in kilo ohms—kΩ) can be found in FIG. 3. The actual graph with the power curve of the invention shown in that patent can be found in FIG. 4. Although it has some degree of power control, it is semi-constant, given the nature of the power output curve of a regular voltage multiplier.

Document WO2013051276 contains a frequency converter, a transformer and a capacitive voltage multiplier composed of diodes and capacitors, more specifically a Cockroft-Walton circuit for several uses. In this invention, the concept is to ensure a voltage boost without impedance matching, multiple peaks of voltage, constant or semi-constant power, nor PWM controls. As proposed, a constant power delivery is optimal for electrical weeding, therefore, it may be used, but it would not fit all scenarios, especially the ones where the load level is not the one where the system outputs peak power or the load varies dynamically, which is the operational scenario of a regular electrical weeding operation. Therefore, it is not suited to the target operation of the present invention.

Document WO2015119523 contains a feedback assembly of transformers and voltage multipliers. It solves the challenge of the dynamically changing load that electrical weeding devices face through a feedback loop that feeds the final transformer outputting AC or highly varying voltage output with a constant voltage waveform. Output coming from a transformer directly means that this varying voltage will have a power curve in time that is not constant, therefore its output cannot provide the ideal constant DC that varies its voltage according to the output load ensuring constant power delivery. Therefore, although it can vary its voltage to face a dynamically changing load, it cannot provide the optimum voltage constantly through a constant DC that varies its voltage according to the output load ensuring constant power delivery. It may provide some degree of impedance matching or some degree of semi-constant power, but as high peaks are parasites to the optimum voltage and constant power delivery, it cannot provide an ample range of semi constant power for a given range of loads, nor can it offer a constant DC output that only varies according to the load, keeping the power output constant. For those reasons, the invention described in WO2015119523 is not optimal to the target objective of the present invention.

Document WO2016016627 relates to the use of outputting processed electrical energy that comprises a waveform with a frequency of at least 18 kHz or more, with peak voltages of at least 1 kV. Although this invention may output a functioning equipment, with the advantages stated in the referred document, it is sub-optimal. As described, the invention of WO2016016627 cannot deal with the varying impedances to output constant (neither semi-constant, for that matter) power. Moreover, the voltage peaks of more than 1 kV reduce the efficacy of the use of electrical energy by not delivering constant DC that only varies with the dynamically changing loads to ensure constant power delivery. WO2016016627 proposes that the use of higher frequency to be less dangerous to humans, but this effect is offset by the need for a much higher voltage output, because to achieve the same power a system with high voltage peaks will need higher peak voltage than a system with continuous DC. This effect is much increased when taken into consideration that the power capabilities of such a system will have to be even higher to account for varying impedances, even if it has a PWM system to ensure that average power is constant. Average power being constant does not mean peak power is constant or closely so.

Document EP3415004B1 relates to the use of capacitors as means of storing energy that is then pulsed to the vegetation. This creates a continuous downward voltage curve on every triggering of the device, which reduces efficiency as the capacitors discharge and less energy is applied. This document also demands a high-voltage pulse generator to ensure a minimum voltage of the application. Limiting the voltage to a minimum is not usable in very large loads, where applied voltage needed may be quite low. Moreover, working with a voltage minimum and letting the power vary according to the load will not be optimum if compared to a system that keeps power constant, as is proposed in the present invention.

SUMMARY OF THE INVENTION

Although it has some degree of power control, the solutions of the prior art are semi-constant, given the nature of the power output curve of a regular voltage multiplier. To improve upon this, a multiple setting of different values for the voltage multiplier can be constructed. For instance, paralleling multiple voltage multipliers with different peaks may provide a power curve with multiple peaks, where the power output is stable at a much wider load range. The results of a combination of two and three of those voltage multipliers can be seen in FIG. 5 and FIG. 6, where two and three peaks can be seen, respectively, and where a growing stable area of semi-constant power can be found.

It is an objective of the current invention to provide use of small, cheap, high-power factor efficient and effective electronic converter to control for constant power output with minimal voltage parasitic fluctuations.

In order to achieve this objective, the present invention proposes a weed inactivation device comprising:

an electrical power source;

at least one electronic converter comprising:

a power inverter;

a transformer coupled to the inverter; and a voltage multiplier coupled to the transformer;

a plurality of electrodes coupled to the at least one electronic converter, wherein at least one electrode is pointed at one or more loads; and a control unit comprising a PWM module and at least one sensor, wherein the PWM module is coupled to the at least one electronic converter and the at least one sensor is coupled to the plurality of electrodes;

wherein the control unit controls the power output of the at least one electronic converter to supply, within a determined load range, substantially constant power to the plurality of electrodes by:

adjusting the duty cycle of the PWM module according to the load; and limiting parasitic voltage peaks to 1 kV.

Voltage peaks relate to small undesired voltage variations due to capacitor discharge, or harmonic interactions between the components. These peaks diminish as frequency and capacitance increases, and must be kept as low as possible to achieve maximum efficiency.

The objectives and advantages of the current invention will become clearer by means of the following detailed description of the example and non-limitative Figures.

DESCRIPTION OF SPECIFIC EMBODIMENTS OF THE INVENTION

Figure 17:
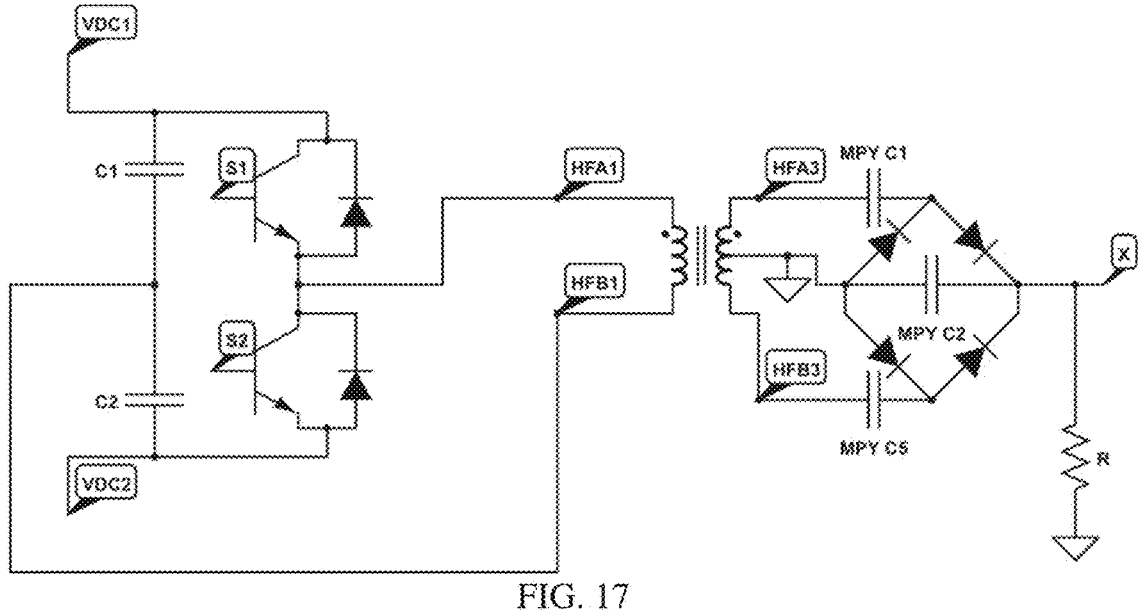
FIG. 17 shows an exemplary embodiment of an electronic converter circuit according to the present invention.
Figure 18:
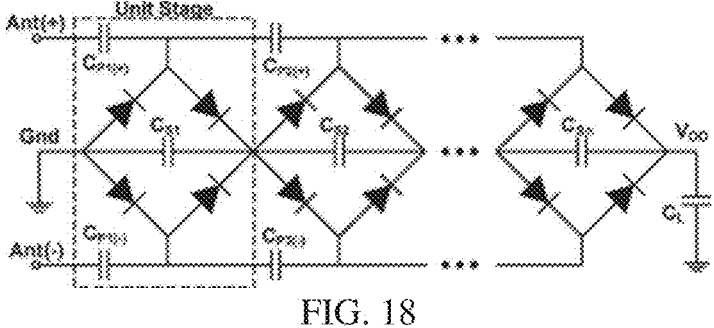
FIG. 18 shows the topology for an arrangement of voltage multiplier circuits that may be used in the electronic converter according to the present invention.

A very simple embodiment of such electronic architecture with only two multiplier arrays connected using a mid-tap reference of the transformer can be found in FIG. 17. It considers the output of a DC input power source as VDC1 and VDC2, switching inputs to control PWM or similar at S1 and S2, higher frequency inputs at the transformer primary as HFA1 and HFB1, higher frequency outputs of the transformer secondary as HFA3 and HFB3, two parallel arrays of multipliers using a common middle capacitor MPY C2, the final output at one electrode is X, the other electrode can be used actively or as ground and the resistive system is R.

Figure 1:
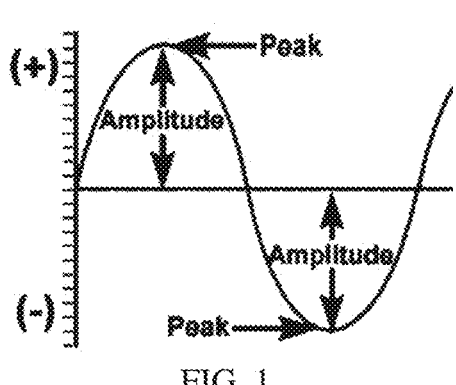
FIG. 1 shows the amplitude and peaks of a generic sinusoidal waveform.
Figure 2:
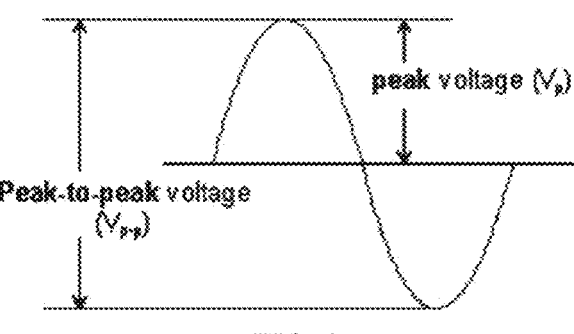
FIG. 2 shows the peak voltage and peak-to-peak voltage of sinusoidal waveforms
Figure 3:
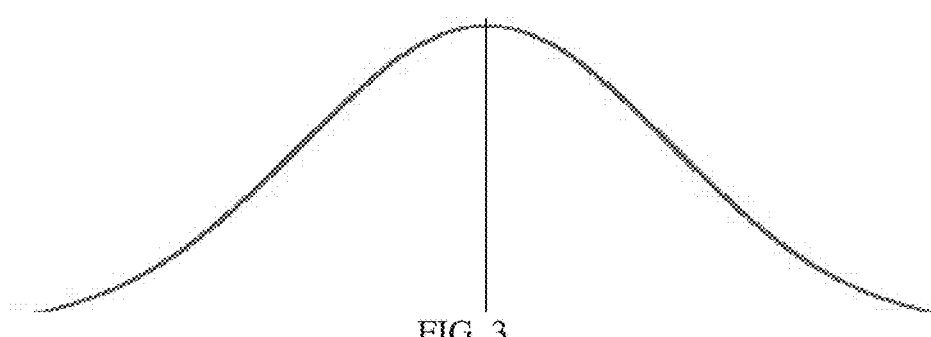
FIG. 3 shows a typical power curve (y axis in watts—w) and the load (x axis in kilo ohms—kΩ).
Figure 4:
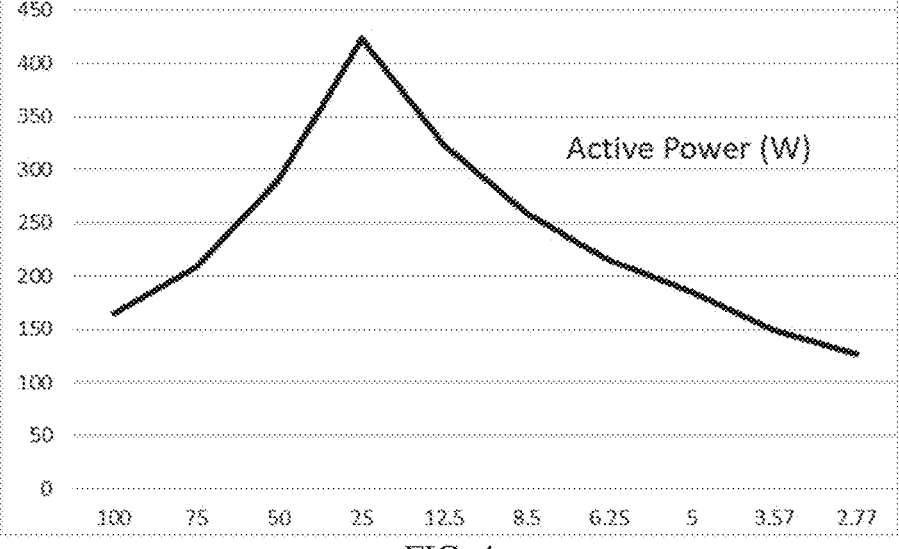
FIG. 4 shows a plot of the power curve as seen in the prior-art.
Figure 5:
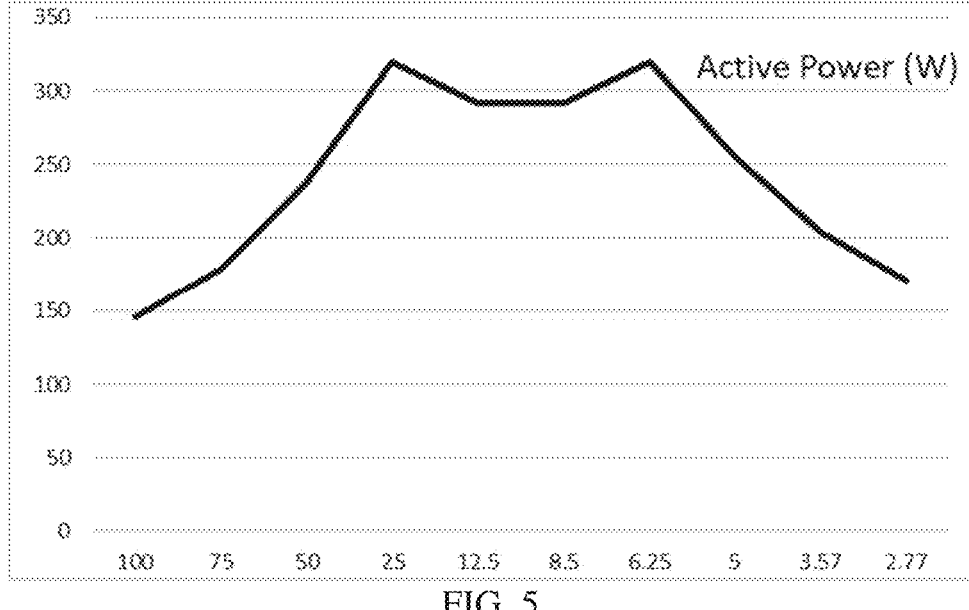
FIG. 5 shows a power curve with two peaks.
Figure 6:
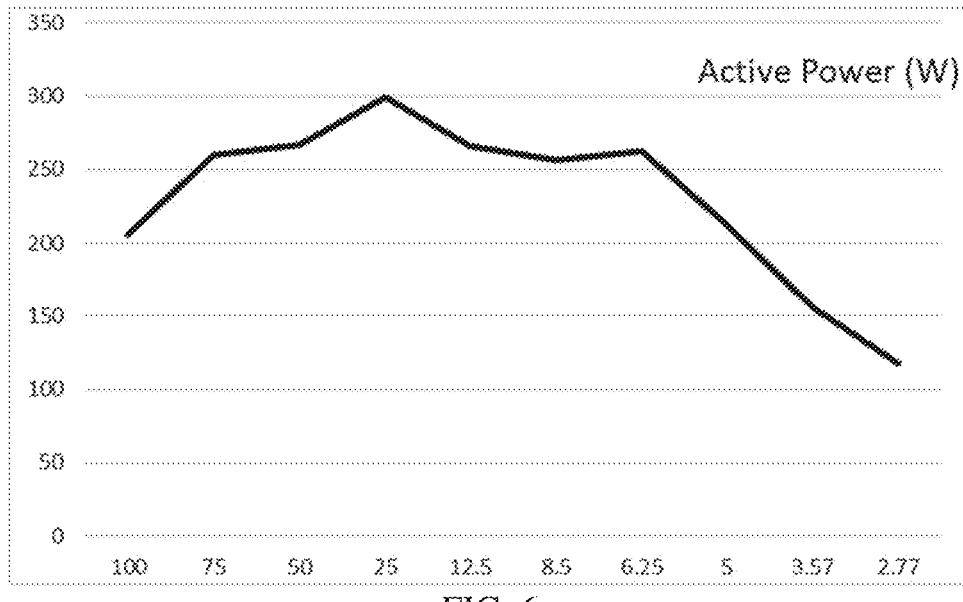
FIG. 6 shows a power curve with three peaks.

For optimal usage, it is desirable to have constant power across a large range of loads. This may be provided through more complex arrays and combinations of voltage multipliers resulting in multiple peaks of power output to ensure a semi-constant power delivery throughout a larger range of resistances such as shown in FIG. 6, and in contrast with FIG. 4, reducing the need to use PWM duty cycles that might be too low, which are potentially more lossy and less energy efficient.

Figure 7:
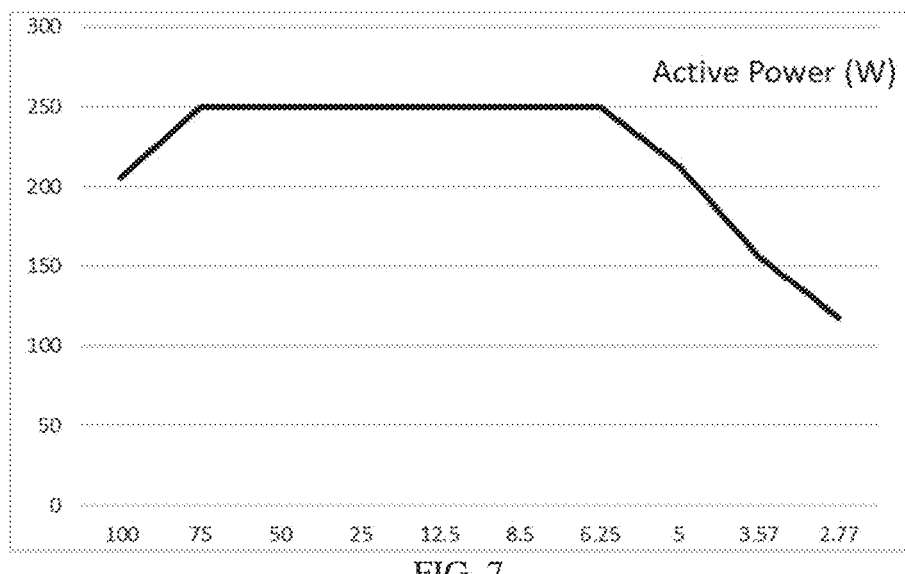
FIG. 7 shows a power curve according to an embodiment of the present invention.

The controlled PWM signal ensures that the voltage output does not have parasitic peak voltages of more than 1 kV, and that the voltage output to be connected to the at least two electrodes is controlled to ensure that the DC power output is constant throughout the usual load range If a pulse width modulation (PWM), pulse density modulation (PDM) or any other similar control used as a feedback loop is incorporated to the improved design, ensuring that the capacitor charge will limit the output voltage to the exact degree that outputs the desired power (i.e., 250 W in this example), the converter may find a large load range where it can function with stable constant power, as shown in FIG. 7.

For that, the needed information for the feedback loop is the output power. If the output power deviates upwards, the PWM (or similar) decreases the duty cycle, if it deviates downwards, it increases the duty cycle.

Figure 8:
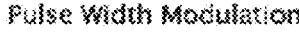
FIG. 8 shows examples of PWM with different duty cycles
Figure 8:
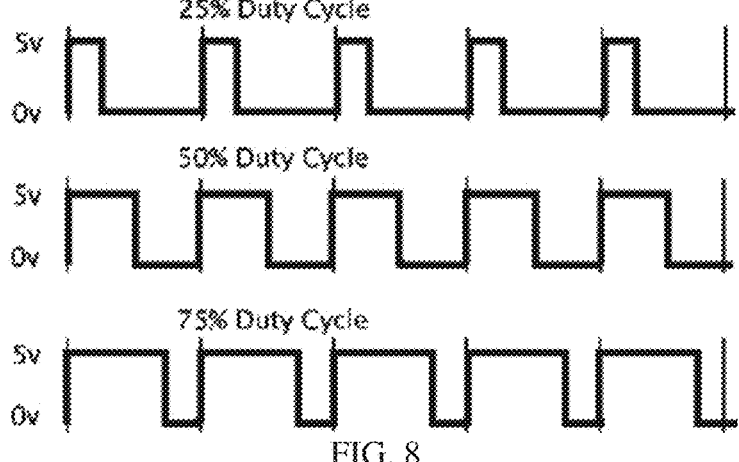
Figure 9:
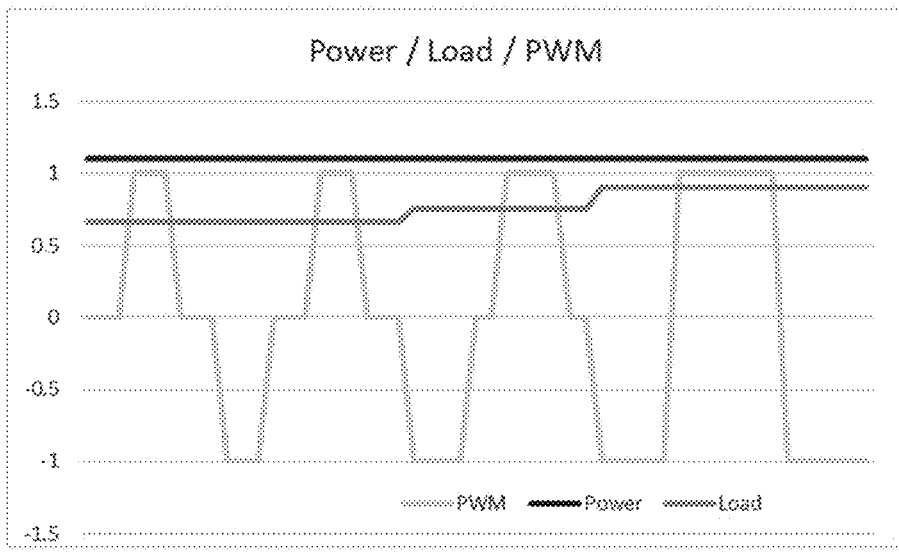
FIG. 9 shows an example of PWM changes to keep constant power upon changes in the load v.

Duty cycle is the amount of time a digital signal is in the "active" state relative to the period of the signal. Duty cycle is usually given as a percentage. For example, a perfect square wave with equal high time and low time has a duty cycle of 50%, as shown in FIG. 8. The duty cycle controls the gates of the inverter (usually IGBTs are used). The proposed system changes the duty cycle to ensure higher duty cycles when power reduces and lower duty cycles if the power increases due to, for instance, a change in load, as exemplified in FIG. 9.

Figure 10:
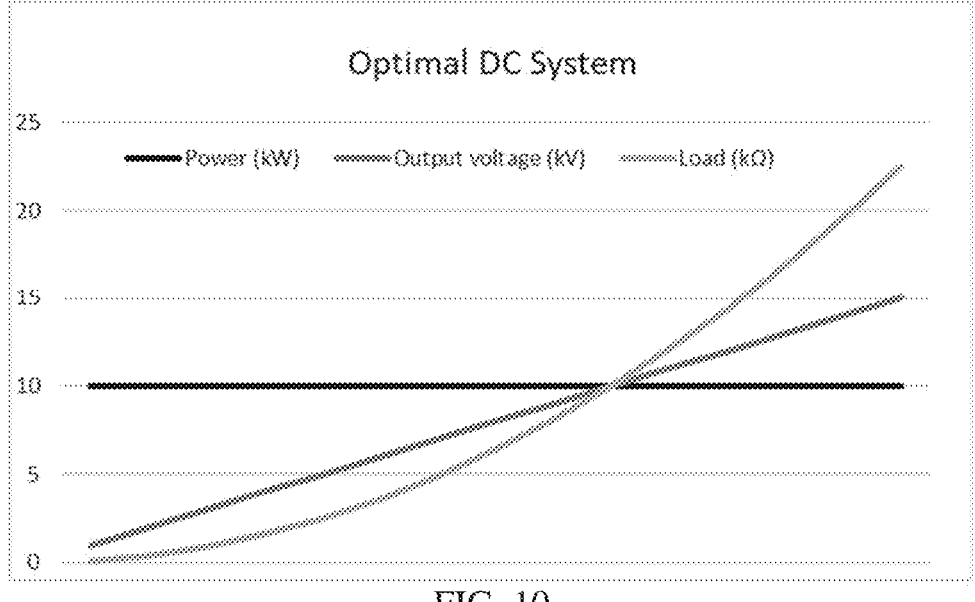
FIG. 10 shows the power relationship for an ideal constant power source.
Figure 11:
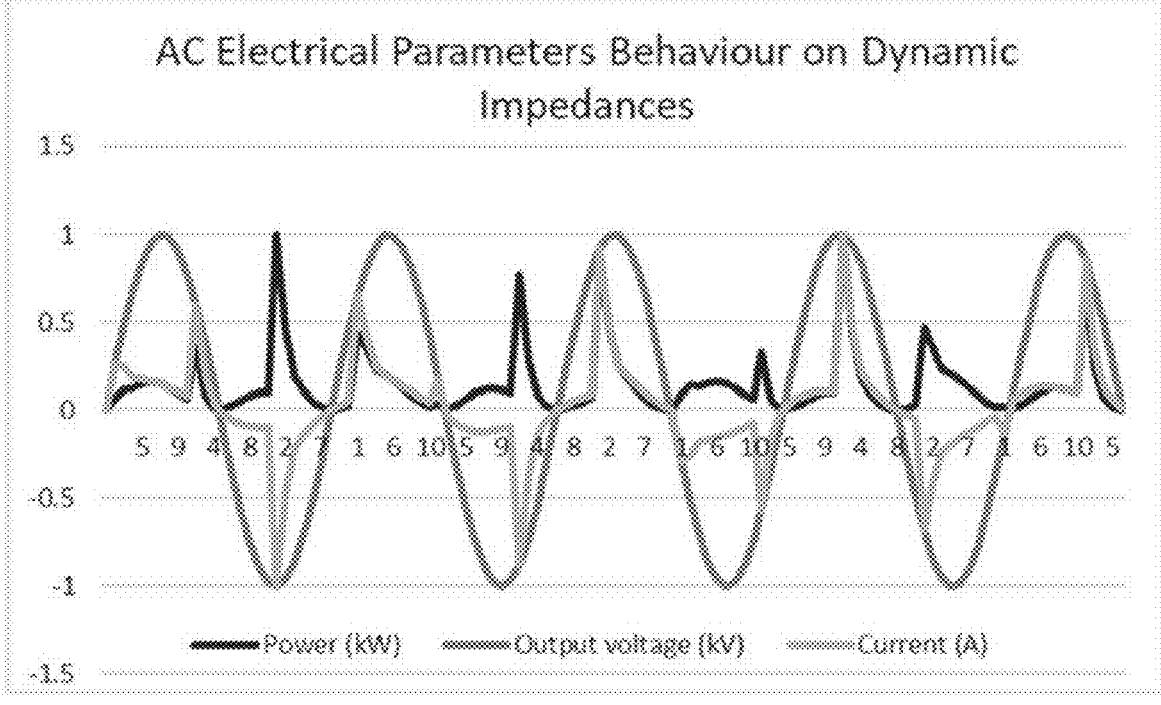
FIG. 11 shows the behavior of AC electrical parameters with dynamic impedances.

The duty cycle adjustments will provide more power keeping the charge of the capacitors of the voltage multiplier at a lower voltage state when the load is lower and keeping the charge of the capacitors of the voltage multiplier at a higher voltage state when the load is higher. This means that with the combination of an architecture of voltage multipliers with multiple voltage peaks throughout a continuum of loads with a PWM control that ensure power delivery never goes above a certain value, it is possible to provide constant power throughout a large load band, and through a dynamically varying load. According to Ohm's law, the relationship between power, voltage and load should follow FIG. 10 for a constant power source.

The addition of an inductor and/or inductive/capacitive filter may allow for the inverter's IGBT to work with resonant switching, reducing its losses and increases the converter's efficiency. The IGBT's in this case is tuned at the resonance between the external inductor and the total capacitance reflected to the transformer's primary or directly to the voltage multiplier, considering the effects of the variable load and the voltage multiplier.

Figure 12:
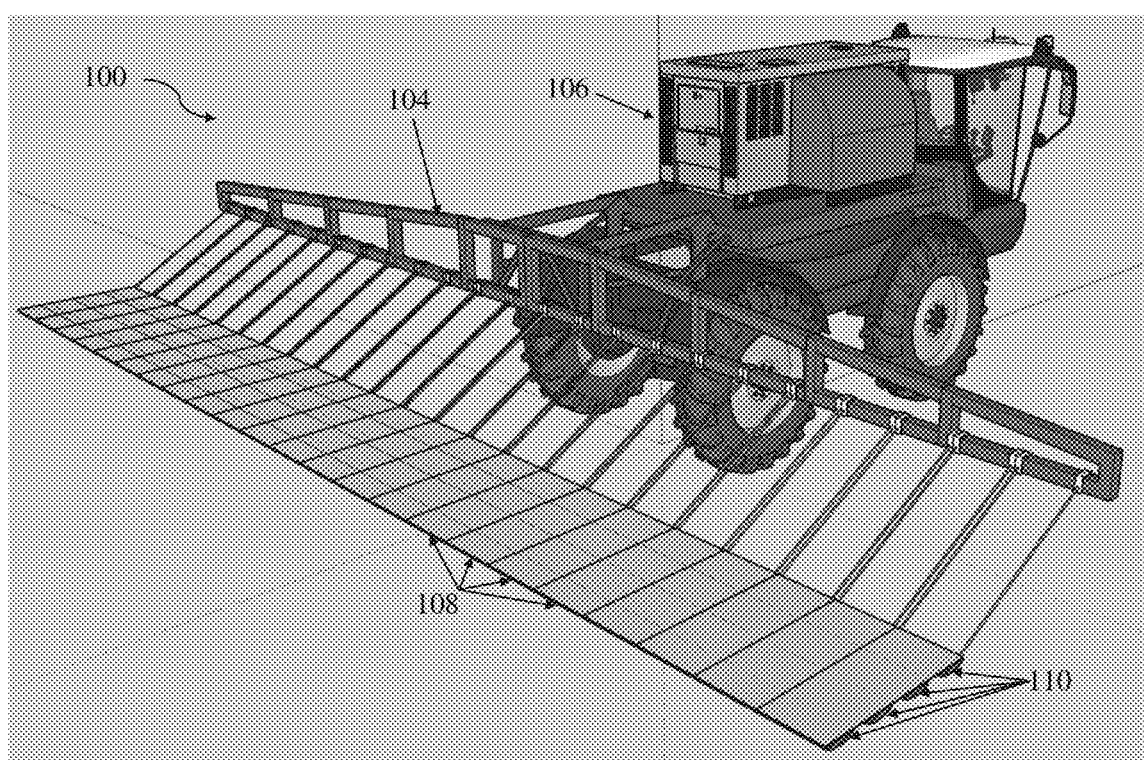
FIG. 12 shows a first example embodiment of an electrical weeding device according to the present invention.
Figure 13:
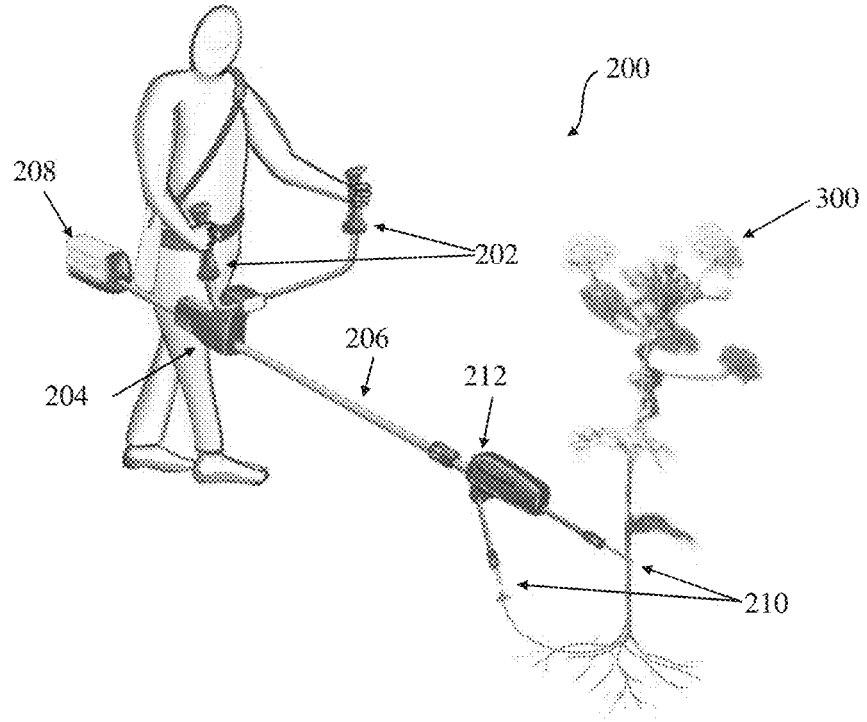
FIG. 13 shows an operator with a second example electrical weeding device according to the present invention.
Figures 14, 15:
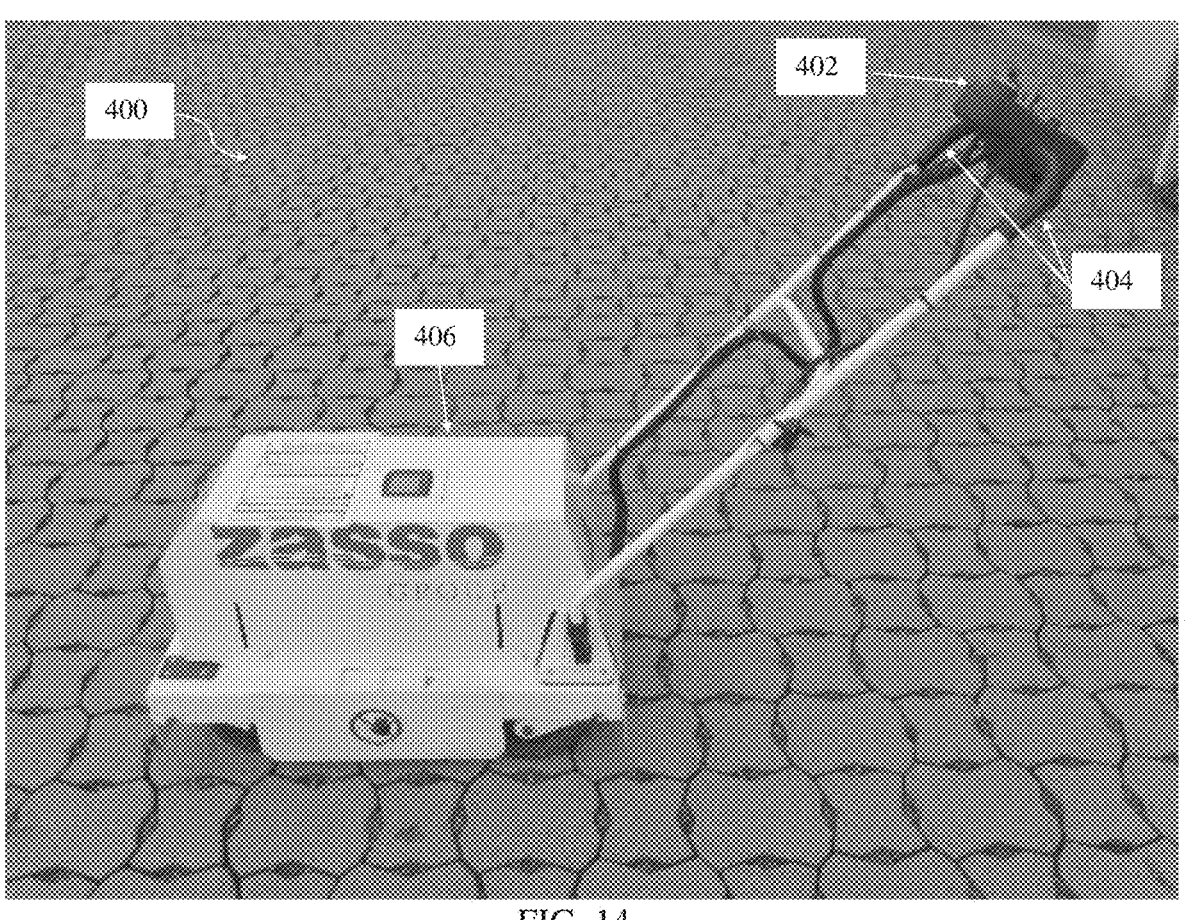
FIG. 14 shows a third example of an electrical weeding device according to the present invention
FIG. 15 shows an example of an arrangement with two electrodes according to an embodiment of the present invention.

FIGS. 12, 13 and 14 show exemplary embodiments of three different electrical weeding devices according to the present invention. The weed inactivation device of the present invention comprises an electrical power source; at least one electronic converter, a plurality of electrodes and a control unit.

Particularly, FIG. 12 shows a vehicle 100 comprising a horizontal beam 104 attached thereto supporting a plurality of mounts 108 each coupled to a plurality of electrodes 110. In addition, the vehicle 100 comprises a housing 106 which holds a power source, an electronic converter and a control unit.

FIG. 13 shows a portable handheld electrical weeding device 200. This handheld device comprises two handles coupled to a housing of the control unit 204. The control unit 204 is coupled to a main shaft 206 which extends both upstream and downstream of the control unit 204. Upstream of the control unit is the power source 208 coupled to an end of the main shaft 206. Downstream of the control unit 206 is the electronic converter 208 coupled to the other end of the main shaft 204. Coupled to the electronic converter is the plurality of electrodes 210 which will deliver the current to kill the plant 300. A usual path of the current is shown by the arrow connecting the electrodes 210.

FIG. 14 shows yet another portable electrical weeding device 400. This device 400 comprises a panel 402 attached to two handles 404. The handles extend downwardly to connect to a housing 406, the housing 406 comprising a power source, a control unit and an electronic converter within said housing 406.

As for the electrodes of the present invention, FIG. 15 shows frontal, lateral and top example views of electrodes 500 used in the present invention. The electrodes are coupled to a support structure 502 that mechanically connects the electrodes 500 to a device such as the device 100 shown in FIG. 12.

Figure 16:
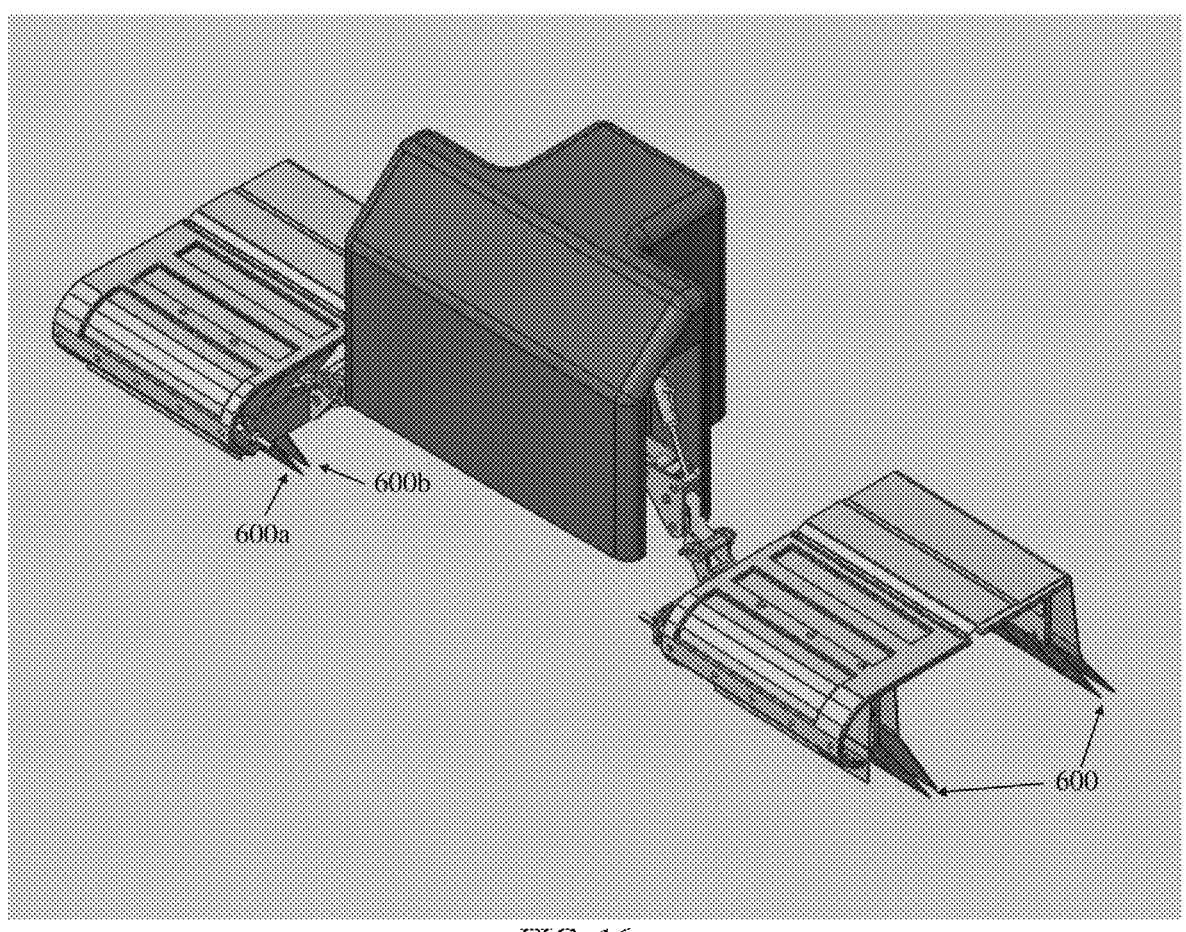
FIG. 16 shows an example of an arrangement with two sets of electrodes, each set with two electrodes, according to an embodiment of the present invention.

FIG. 16 shows another example of electrodes according to the present invention. These sets of electrodes 600 comprise first and second electrodes 600a, 600b.

Turning to the electronic converter according to the present invention it comprises a power inverter, a transformer coupled to the power inverter and a voltage multiplier coupled to the transformer. Power inverters are power electronic devices capable of converting direct current energy to alternating current energy in an almost lossless manner. This is possible by employing an assortment of electronic switches, usually transistors (bipolar junction, MOSFET or IGBTs selected according to the switching frequencies), which are commuted (changing from on/off states periodically) in synch by a gate controller to achieve a determined reference signal. The result is a pulse width modulation (PWM) or a pulse density modulation of the DC energy of the input, which after filtering results in an AC waveform closely resembling the desired reference signal.

The output of the power inverter is then coupled to the primary of a transformer, which provides galvanic isolation to the converter and enables both the inverter and the voltage multiplier to work almost independently. For size reduction, the transformers used in the present invention are preferably high-frequency transformers. For safety reasons, the transformers need to be able to sustain high voltages without damaging their internal and external isolations.

Figure 19:
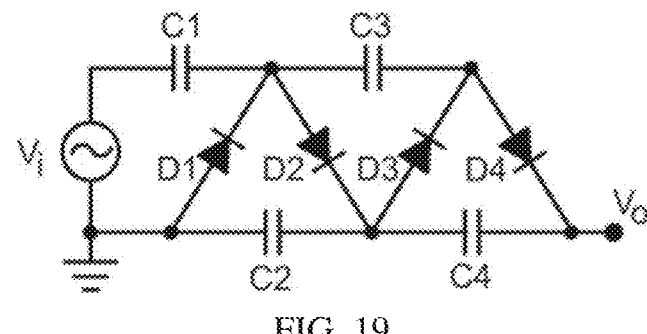
FIG. 19 shows an alternative topology of a voltage multiplier circuit that may be used in the electronic converter according to the present invention.
Figure 20:
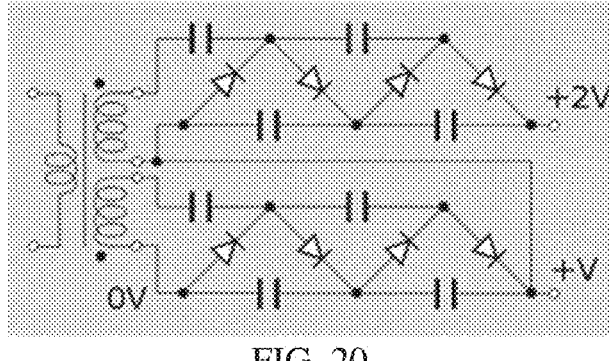
FIG. 20 shows another alternative topology of a voltage multiplier circuit that may be used in the electronic converter according to the present invention.

Further, the voltage multiplier is then coupled to the secondary of the transformer. Several different topologies of voltage multipliers exist in the literature. For the applications of the present invention, size and cost are significant constraints therefore topologies involving capacitor and diode arrangements are preferred. FIGS. 17 to 20 show some of these topologies. Stacking multiple voltage multipliers, as shown for example in FIG. 18, makes it possible to achieve high voltages with a few iterations. In the circuit of FIG. 19, for instance, the output voltage Vo is 4 times the input Vi with few as 4 diodes and 4 capacitors. In the example of FIG. 20 is shown a transformer in which the secondary has two separate windings with 180° phase shift in in order to get full wave rectification. The two windings need to be insulated against the large voltage between them, though.

One additional advantage of voltage multiplier topologies comprising diodes and capacitors is that the output is often rectified, that is, converted from AC to DC. This avoids having to include one module specifically for this purpose.

The output of the electronic converter, i.e., the output of the voltage multiplier, is then coupled to the electrodes of the weed inactivation device to provide the necessary power to perform weed inactivation. To ensure that a constant amount of power is provided to the electrodes, thus to the weeds themselves, a control unit may be coupled to both the electrodes and the electronic converter.

This control unit comprises a PWM module and at least one sensor: the PWM module being coupled to the at least one electronic converter and the at least one sensor being coupled to the electrodes. The purpose of this coupling is to form a closed feedback loop allowing the control unit to monitor the power provided to the electrodes (by measuring voltage, current or both) and adjust the duty cycle of the power inverter's PWM to ensure that substantially the same amount of power is being provided to the electrodes regardless of the load (such as weed, weed-soil or weed-soil-weed resistances). For example, if the control unit is configured to ensure a given constant power output (within an acceptable margin of error), should the power output be above the upper limit of an acceptable threshold, the control unit should reduce the duty cycles of the PWM; should the power output be below the lower limit of the threshold, the control unit should increase the duty cycles of the PWM.

Although the output is rectified it is not necessarily stable and constant. Since the capacitors are not ideal components, their charge/discharge cycles produce an unavoidable parasitic voltage peaks in the output. However, for performance and efficiency reasons, these parasitic voltage peaks on the output should be as low as possible and not superior to 1 kV.

The resistive system (load) is the sum of the resistance faced by the electrodes. It can be composed either of the sum of the serial resistances of targeted plant or plants and the soil, or a plant or plants, soil, plant or plants arrangement.

The usual operational load range of the resistive system varies between 0.5 kΩ to 20 kΩ, but it may go up to 50 kΩ in urban or railroad beds. The load range may change slightly according to the crop or geography the invention is set to operate.

The only downside for such a system is that it by itself may work to maintain voltaic arcs that may be created when the electrodes briefly leave the resistive system and travel through the air without proper contact. There are mechanical solutions to minimize this effect, but sensors that sense electrical parameters of the resistive system or the creation of sparks themselves can be used to signal to briefly interrupt, for 1 ms up to 1000 ms, the application and extinguish any sparks before they represent a higher fire hazard. Another solution is to periodically do so.

So, in the state of the art, even when targeting only one plant, AC or high voltage peak waveforms would cause electrical weeding systems to present different efficacies at different plants with different electrical resistances, so being not optimal to the objectives of the present invention. Therefore, the present invention can claim to be the only one to take the most out of the power source by keeping the output power constant throughout a varying load band, delivering the same power regardless of plant and soil resistance, ensuring application quality uniformity, combining impedance matching of capacitive voltage multipliers to broaden the semi constant power band and keeping the power constant throughout the aforementioned varying load band by controlling the charge present at the capacitors in the voltage multiplier connected to the application electrodes through PWM feedback controls.

The invention claimed is:

1. A weed inactivation device (100, 200, 400) comprising:
an electrical power source (208);
at least one electronic converter (212) comprising:
   a power inverter;
   a transformer coupled to the inverter; and
   a voltage multiplier coupled to the transformer;
a plurality of electrodes (210, 500, 600) coupled to the at least one electronic converter (212), wherein at least one electrode (210, 500, 600) is pointed at one or more loads (300); and
a control unit comprising a PWM module and at least one sensor, wherein the PWM module is coupled to the at least one electronic converter and the at least one sensor is coupled to the plurality of electrodes (210, 500, 600);
the voltage multiplier has one or more stages for enabling impedance matching and generating a plurality of power peaks throughout a determined load range; and
the control unit configured to controls the power output of the at least one electronic converter to supply, within the determined load range, substantially constant power to the plurality of electrodes by:
adjusting the duty cycle of the PWM module according to the load; and
outputting DC voltage and limiting parasitic voltage peaks to 1 kV.

2. The weed inactivation device according to claim 1, wherein the output power varies according to the sensor that determines weed pressure.

3. The weed inactivation device according to claim 1, wherein power supply is interrupted periodically to extinguish voltaic arcs.

4. The weed inactivation device according to claim 1, wherein power supply is interrupted for a period between 1 and 1.000 ms when an electrical parameter of the resistive system causes a voltage of the load to increase becoming greater than a threshold that is empirically known to increase fire hazard.

5. The weed inactivation device according to claim 1, wherein the control unit interrupts power supply to the electrodes when a voltaic arc is detected.

6. The weed inactivation device according to claim 1, wherein the inverter comprises an arrangement of semiconductor transistors preferably selected from the group comprising bipolar transistors, MOSFETs and IGBTs.

7. The weed inactivation device according to claim 1, wherein the transformer comprises a center tap.

8. The weed inactivation device according to claim 7, wherein the voltage multiplier uses the center tap of the transformer as reference and is a multi-stage cascaded voltage multiplier.

9. The weed inactivation device according to claim 1, wherein each electrode of the plurality of electrodes is coupled to a single electronic converter of the at least one electronic converter.

10. The weed inactivation device according to claim 1, comprising at least two electronic converters and more than one distinct circuit topology.

11. The weed inactivation device according to claim 1, wherein the at least one sensor comprises at least one voltage sensor or current sensor.

12. The weed inactivation device according to claim 1, wherein the control unit is further configured to:
reduce the duty cycles of the PWM of the inverter if the power output in the plurality of electrodes is above a determined power value; and
increase the duty cycles of the PWM of the inverter if the power output in the plurality of electrodes is below a determined power level.

* * * * *